(12) United States Patent
Preston et al.

(10) Patent No.: US 6,382,183 B1
(45) Date of Patent: May 7, 2002

(54) FUEL SYSTEM PRESSURE REGULATOR

(75) Inventors: Grover Wesley Preston, Livonia; Steven J Fogarassy, Webster, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/710,523

(22) Filed: Nov. 9, 2000

(51) Int. Cl.[7] .............................................. F02M 41/00
(52) U.S. Cl. .................. 123/457; 92/103 M; 251/335.2
(58) Field of Search ...................... 123/457, 510–511, 123/514, 459; 92/90, 96, 103 R, 103 M, 98 R; 251/335.2

(56) References Cited

U.S. PATENT DOCUMENTS

| | | | | |
|---|---|---|---|---|
| 4,284,039 A | * | 8/1981 | Bellicardi et al. ........... | 123/463 |
| 4,596,219 A | * | 6/1986 | Kemmer ..................... | 123/467 |
| 4,646,700 A | * | 3/1987 | Tuckey ....................... | 123/510 |
| 4,928,729 A | * | 5/1990 | Hornby ....................... | 137/510 |
| 5,076,320 A | * | 12/1991 | Robinson ..................... | 123/463 |
| 5,435,344 A | * | 7/1995 | Robinson et al. ........... | 123/508 |
| 5,794,597 A | * | 8/1998 | Schwegler et al. ......... | 123/514 |

\* cited by examiner

Primary Examiner—Thomas N. Moulis
(74) Attorney, Agent, or Firm—John VanOphem

(57) ABSTRACT

A fuel pressure regulator includes three major components, a lower housing, a control member comprising an resilient diaphragm mounted on the housing and a tubular return member mounted in a fuel return opening of the housing. The control member is preferably formed of resilient sheet metal and includes at least one annular convolution between the mounting portion and a stiff center portion configured as an inverted dome with a lower center part that acts as a valve member. The control member acts as a cover closing the internal fuel chamber and responds as a diaphragm to changes in pressure within the fuel chamber to flex upwardly by a rolling action of the convolution, which lifts the domed central portion, opening the valve and allowing excess fuel to drain through the return member. The regulated pressure is set by adjusting via sliding or threading the return member upwardly, forcing the valve seat against the valve member portion of the control member diaphragm so that the spring force of the diaphragm is preloaded to a desired value.

17 Claims, 2 Drawing Sheets

FUEL SYSTEM PRESSURE REGULATOR

TECHNICAL FIELD

This invention relates to pressure regulators for automotive fuel systems and more particularly to a simplified fuel pressure regulator.

BACKGROUND OF THE INVENTION

It is known in the art relating to automotive fuel systems to provide a fuel pressure regulator for maintaining an essentially constant pressure of fuel supplied to the fuel injectors. The pressure regulator may be mounted in or on the fuel tank or at some other suitable location in the fuel system.

Pressure regulators come in many differing designs. However, one type of fuel pressure regulator has as many as fourteen or more components assembled together in a regulator assembly. In one such regulator, a rubber-like diaphragm is clamped together with a valve stop member between a lower housing and an upper cover. The diaphragm has a central valve carrier mounting a spring seat and including a pivotable valve element having a small spring biasing the valve element against a retainer. The cover has an adjusting screw which engages an upper spring guide for adjusting a spring extending between the two valve guides and biasing the valve toward a closed position. The lower housing has a valve seat engagable by the valve element when the valve is closed.

Fuel pressure admitted to a fuel chamber below the diaphragm causes the diaphragm to be lifted against the spring bias when a predetermined pressure level is reached. This opens the valve and allows excess fuel to pass through an outlet opening in the valve seat so that the predetermined pressure is maintained. The adjusting screw is used to adjust the spring force to set the predetermined control pressure for the fuel system. While the regulator performs this function well, it is desired to provide a simplified regulator design, which will accomplish the desired pressure regulating function with fewer parts and reduced assembly costs.

SUMMARY OF THE INVENTION

The present invention provides a substantially simplified pressure regulator having only three major components. One of the components is a lower housing having an open end and defining an internal fuel chamber. The housing includes a fuel return opening centrally located opposite the open end and fuel inlet openings through a lower portion of the housing.

The regulator also includes a control member comprising an imperforate resilient spring diaphragm. The control member is mounted in the open end of the housing with an outer end mounting portion brazed within the housing. The diaphragm is preferably formed of resilient sheet metal, such as is used in bellows, and includes at least one annular convolution between the mounting portion and a center portion. The center portion is configured as an inverted dome with a lower center part that acts as a valve member.

A tubular return member is adjustably mounted in the fuel return opening of the valve lower housing. An inner end of the return member forms a valve seat, preferably including a resilient seal such as an 0-ring. The 0-ring surrounds a central opening which communicates with the fuel passage through the return member.

The control member acts as a cover closing the internal fuel chamber. The control member also responds as a diaphragm to increasing pressure within the chamber to flex upwardly, by a rolling action of the convolution, which lifts the domed central portion. The regulated pressure is established or set by sliding or threading the return member upwardly, forcing the valve seat against the valve member portion of the control member diaphragm so that the spring force of the diaphragm is preloaded to a desired value. Thus, when the regulating pressure is reached, the center portion of the control member is raised off of the valve seat so excess fuel is discharged through the return member while the fuel pressure is regulated at the preset established pressure. In this simplified assembly, the control member acts as a cover, a diaphragm and a spring so that the separate spring, common in the prior art, is not required. Thus, the final assembly of the regulator is simplified by a reduction in the number of parts and reduced assembly costs.

These and other features and advantages of the invention will be more fully understood from the following description of certain specific embodiments of the invention taken together with the accompanying drawings.

DESCRIPTION OF THE PREFERRED EMBODIMENT

Figure 1:
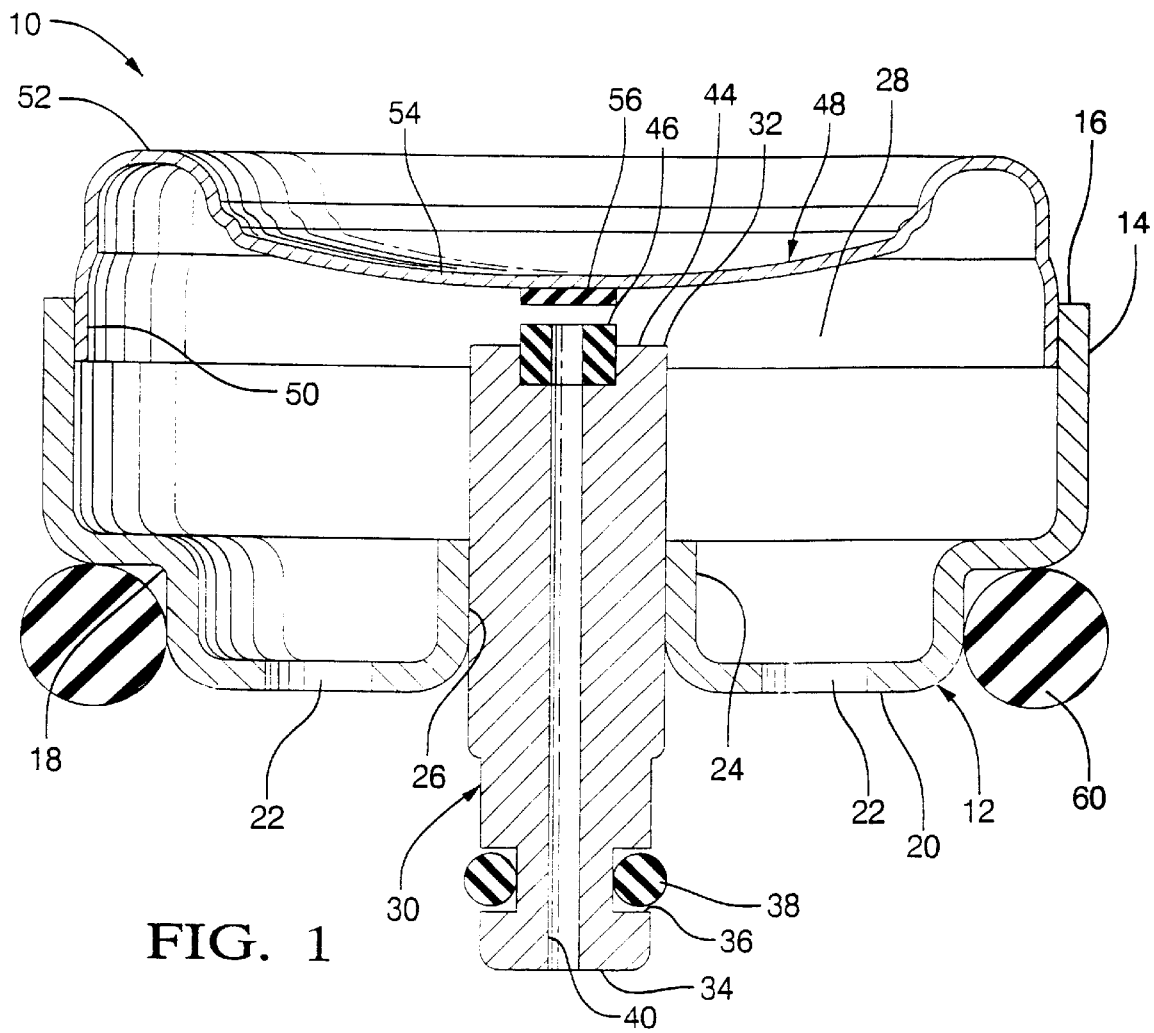
FIG. 1 is a transverse cross-sectional view of a fuel pressure regulator assembly formed according to the invention.
Figure 2:
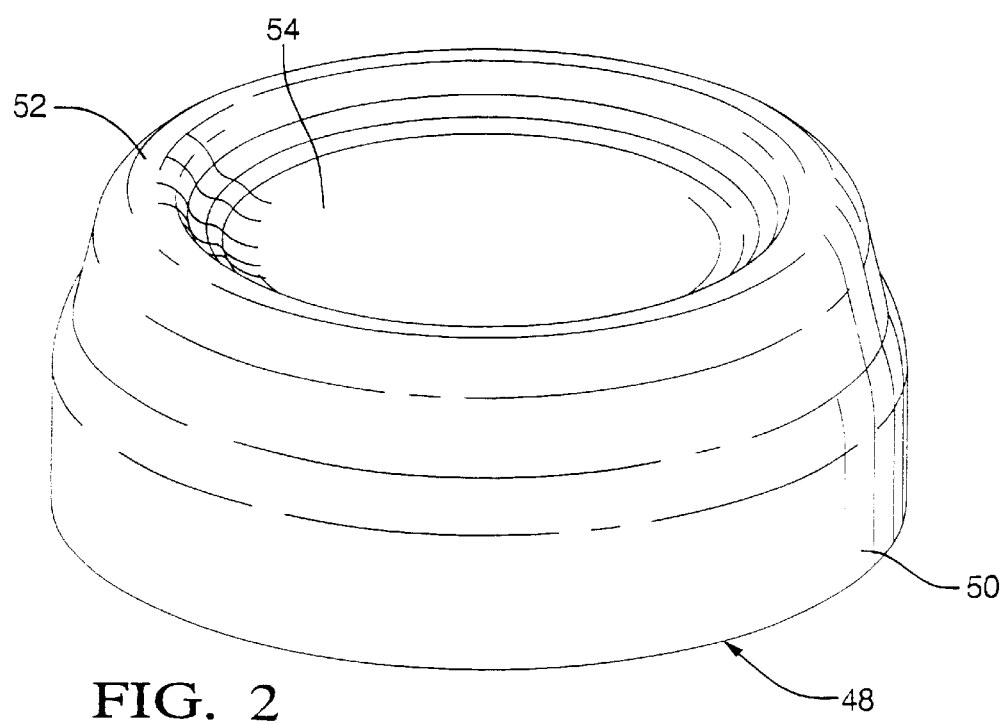
FIG. 2 is a pictorial view of a control member comprising a combination cover, diaphragm and spring as shown in the embodiment of FIG. 1.
Figure 3:
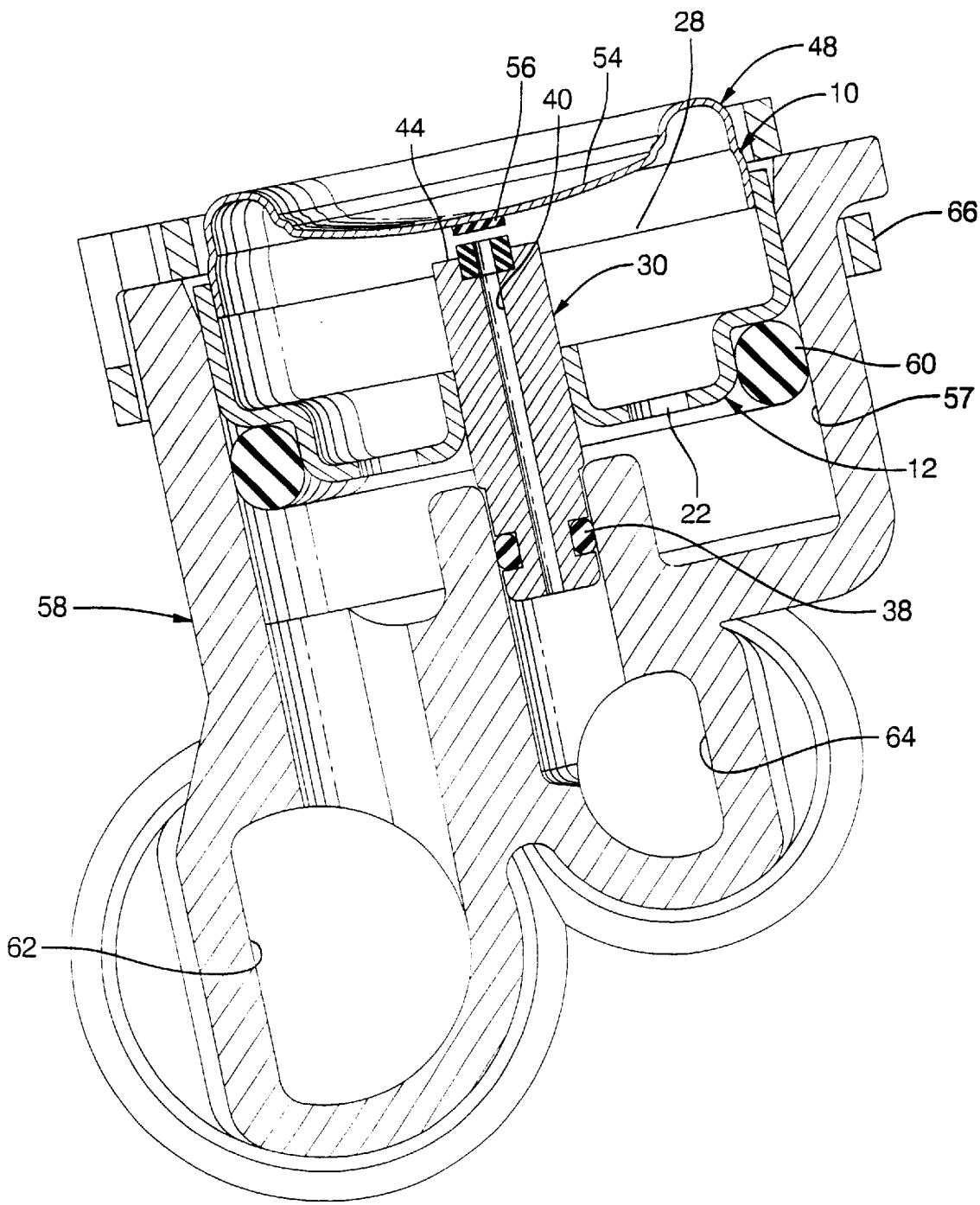
FIG. 3 is a cross-sectional view of a fuel manifold having mounted therein the pressure regulator of FIG. 1.

Referring now to the drawings in detail, numeral 10 generally indicates a fuel pressure regulator according to the invention. Regulator 10 includes a lower housing 12 having a generally cylindrical upper portion 14 terminating in an open top 16. The housing is preferably made of formed sheet metal and includes an annular seal recess 18 spaced below the upper portion 14 and above a lower wall 20. The lower wall has a plurality of fuel inlet openings 22 and terminates inwardly in an upwardly extending flange 24 defining a fuel return opening 26. An internal fuel chamber 28 is defined within the lower housing 12.

Within the return opening 26 there is mounted a tubular return member 30 having an inner end 32 and an outer end 34. Around the outer end a seal groove 36 receives an 0-ring seal 38. A fuel return passage 40 extends through the return member 30 and ends at the inner end 32 which defines a valve seat 44 within which a suitable fuel resistant seal member 46 is located.

The open top 16 of the housing 12 is closed by a control member 48, preferably formed of resilient material such as spring sheet metal. Control member 48 acts as a cover, a diaphragm and a spring, as will be described. The control member includes a generally cylindrical mounting portion 50 brazed, or otherwise sealingly retained, in the upper portion of the lower housing 12. Mounting portion 50 connects axially with an intermediate annular flexible portion defined by a single convolution 52. The convolution 52 connects inwardly with a stiff center portion 54 formed in the shape of an inverted dome. The lower center portion of the dome 54 acts as a valve portion 56, which is adapted to engage the valve seat 44 with seal member 46 to close communication between the fuel chamber 28 and the fuel return passage 40 through the return member 30.

The pressure regulator 10 is adapted to be sealingly received in a recess 57 of a fuel manifold 58 at a joint having an 0-ring seal 60 to prevent leakage of pressurized fuel supplied through a fuel supply line 62. Similarly, the fuel manifold engages the seal 38 at the outlet of the return member 30 so that fuel is directed back through a return line 64 in the manifold. The fuel supply line 62 is connected internally to an in-tank fuel pump, not shown, which feeds pressurized fuel to the pressure regulator 10 through the inlet openings 22. The return line 64 connects directly with a fuel tank, not shown, to return excess fuel to the tank. A retainer clip 66 may be used to retain the regulator 10 in place in the fuel manifold 58.

In assembly of the pressure regulator 10, the control member 48 is preloaded to a desired pressure setting by sliding or threading the return member 30 upwardly in the return opening 26. The upwardly moving valve seat 44 engages the lower valve portion 56 of the control member and forces the center portion 54 upward until a desired displacement force or pre-stress of the spring diaphragm or control member 48 is reached. This establishes the fuel pressure in fuel chamber 28, which is required to unseat the valve portion 56 from the valve seat 44 and allow return fuel flow through the passage 40 from the fuel chamber 28 to thus maintain the fuel pressure at the desired setting.

In operation, fuel is delivered from a fuel pump, not shown, to the fuel supply line 62, from which it passes through openings 22 into fuel chamber 28 of the fuel pressure regulator 10. When the pressure rises to the preset pressure regulating setting, the force exerted by the fuel lifts the inverted dome center portion 54 of the control member by flexing the convolution 52 and lifting the valve portion 56 off the valve seat 44. Excess fuel is then allowed to flow through the return passage 40 and return line 64 to the tank while the regulator 10 controls fuel flow to maintain the regulated pressure in the fuel chamber 28, which regulates the pressure to the fuel injectors, not shown.

The design of the control member 48 is specifically selected to allow the resilient sheet metal member to satisfactorily perform its various functions. The cylindrical mounting portion 50 is designed to be received within the cylindrical upper portion 14 of the housing 12 and to be brazed therein to provide a seal against fuel leakage. The annular convolution 52 is shaped to allow a rolling motion flexing of the diaphragm-like member that provides axial motion of the center portion 54 which carries the valve portion 56. The center portion 54 is shaped as an inverted dome so that it remains stiff, retaining its shape so that the flexing of the annular convolution 52 acts only to raise and lower the central domed portion 54 axially and avoids any tilting or other undesired motion in the central portion of the control member 48. Thus, the control member 48 is designed to perform its tri-function operation as a cover, diaphragm and spring member.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A fuel pressure regulator comprising:

a housing defining an internal fuel chamber, the housing having an open end, a return opening disposed opposite the open end, and an inlet opening communicating with the fuel chamber;

a tubular return member adjustably mounted in the return opening and having inner and outer ends, the return member including a through flow passage communicating with the fuel chamber and defining a valve seat at the inner end, and a control member mounted on the open end of the housing and enclosing the fuel chamber, the control member comprising an imperforate resilient spring diaphragm having an outer edge sealed to the housing and a central valve portion engagable with the valve seat to cut off fuel flow through oil the return member;

the control member acting as a cover closing the open-end of the housing against fuel leakage and responsive to excess pressure in the fuel chamber to discharge fuel through the return member and control fuel pressure by varying return fuel flow through the valve portion.

2. A fuel pressure regulator as in claim 1 wherein the control member is preloaded by adjustment of the return member in the housing to seat the valve portion on the valve seat and resiliently deform the control member to set a positive opening pressure for the valve portion.

3. A fuel pressure regulator as in claim 1 wherein the control member has a relatively stiff center portion and an annular flexible portion surrounding the center portion and connecting with a mounting portion, the flexible portion allowing motion of the center portion relative to the mounting portion in response to pressure in the fuel chamber.

4. A fuel pressure regulator as in claim 3 wherein the control member mounting portion is received in a generally cylindrical portion of the housing and is sealingly retained therein by brazing.

5. A fuel pressure regulator as in claim 3 wherein the flexible portion is formed with at least one annular convolution generating essentially axial motion of the center portion.

6. A fuel pressure regulator as in claim 4 wherein the center portion has an inverted dome configuration with the central valve portion at the lowest point of the dome.

7. A fuel pressure regulator as in claim 1 wherein the control member is formed from a resilient sheet metal material.

8. A fuel pressure regulator as in claim 1 wherein the valve seat includes a resilient seal engagable by the central valve portion when the valve is closed.

9. A fuel pressure regulator as in claim 1 wherein the housing is configured to be sealingly received in a cylindrical recess of a fuel supply member and the return member is configured to be seatingly connected with a fuel return line in the supply member.

10. A fuel pressure regulator comprising:

a housing defining an internal fuel chamber having a first end, a return opening communicating with the fuel chamber, and an inlet opening communicating with the fuel chamber, the first end of the housing including a control member at least partially enclosing the fuel chamber, the control member comprising a resilient diaphragm having an outer edge and a central valve portion;

a return member mounted in the return opening and having first and second ends, the return member including a passage communicating with the fuel chamber and defining a valve seat at the first end; and wherein the control member responds to pressure changes in the fuel chamber to move the central valve portion with respect to the first end of the return member to cut off fuel flow through the return member.

11. A fuel pressure regulator as in claim 10 wherein the return member is adjustably mounted within the return opening to adjust the preload of the control member in the housing.

12. A fuel pressure regulator as in claim 10 wherein the control member includes a relatively stiff center portion including a valve portion and an annular flexible portion surrounding the center portion and connecting with a mounting portion, the annular flexible portion allowing motion of the center portion relative to the mounting portion in response to pressure in the fuel chamber.

13. A fuel pressure regulator as in claim 12 wherein the flexible portion is formed with at least one annular convolution for generating essentially axial motion of the center portion.

14. A fuel pressure regulator as in claim 12 wherein the center portion has an inverted dome and wherein the central valve portion is located at the lowest point of the dome.

15. A fuel pressure regulator as in claim 10 wherein the control member is formed from a resilient sheet metal material.

16. A fuel pressure regulator as in claim 11 wherein the valve seat includes a resilient seal engagable by the central valve portion when the valve is closed.

17. A fuel supply member, comprising:

a fuel manifold having a fuel inlet, a fuel outlet and a recess for receiving a pressure regulator, said pressure regulator, comprising:

a housing defining an internal fuel chamber having a first end, a return opening communicating with the fuel chamber, and an inlet opening. communicating with the fuel chamber, the first end of the housing including a control member at least partially enclosing the fuel chamber, the control member comprising a resilient diaphragm having an outer edge and a central valve portion;

a return member mounted in the return opening and having first and second ends, the return member including a passage communicating with the fuel chamber and defining a valve seat at the first end; and wherein the control member responds to pressure changes in the fuel chamber to move the central valve portion with respect to the first end of the return member to cut off fuel flow through the return member.

* * * * *